Figure 1:
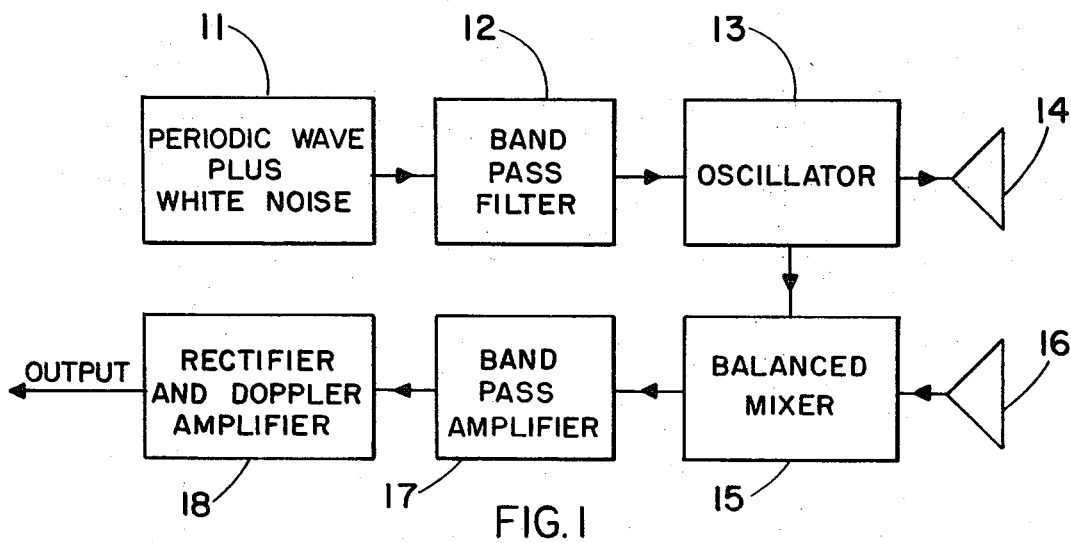

United States Patent

[11] 3,614,783

| [72] | Inventor | Donald J. Adrian<br>Arlington, Calif. |
|---|---|---|
| [21] | Appl. No. | 762,897 |
| [22] | Filed | Sept. 23, 1958 |
| [45] | Patented | Oct. 19, 1971 |
| [73] | Assignee | The United States of America as represented by the Secretary of the Navy |

[54] FM CROSS-SIDEBAND FUSE SYSTEM
8 Claims, 2 Drawing Figs.

[52] U.S. Cl. .................................................. 343/7 PF, 102/70.2 P
[51] Int. Cl. ..................................................... G01s 9/02, F42c 13/04
[50] Field of Search .......................................... 343/8, 9, 14, 7, 17.2; 102/70.2 P, 70.2

[56] References Cited
UNITED STATES PATENTS

| 2,958,862 | 11/1960 | Rey .............................. | 343/14 |
| 2,760,188 | 8/1956 | Guanella et al. ............... | 343/7 |
| 2,842,764 | 7/1958 | Harvey .......................... | 343/14 |
| 2,911,639 | 11/1959 | Hopkins ....................... | 343/7 |

Primary Examiner—T. H. Tubbesing
Attorneys—Q. B. Warner and J. M. St. Amand

CLAIM: 1. An FM doppler fuse system comprising means for transmitting a signal having a carrier frequency modulated by a band of random noise plus periodic modulation, means for mixing the transmitted signal with a return echo signal modified by the doppler effect of the relative movement between the fuse and a target and means for deriving an output operable to actuate said fuse from frequencies above the low-frequency doppler band of the output from said mixing means.

INVENTOR.
DONALD J. ADRIAN

FM CROSS-SIDEBAND FUSE SYSTEM

The invention described herein may be manufactured and used by or for the Government of the United States of America for governmental purposes without the payment of any royalties thereon or therefor.

This invention relates to a fuse system and more particularly to an FM cross-sideband correlation fuse system using noise plus periodic modulation to provide a more rapid and unambiguous range cutoff and a band-pass amplifier adapted to pass only that portion of the mixed transmitted and received signals above the low-frequency doppler band whereby a reduced response or "hole" is provided in the range function at close ranges. A "hole" in the range function or a reduced sensitivity at close range is required to reduce the possibility of detonating a fuse on a reflection from the vehicle containing the fuse system. This might be a reflection off a missile fin, etc., or even signal leakage from the transmitting to the receiving antenna.

One of the prior frequency-modulated doppler fuse systems utilizes a sinusoidal frequency modulation to give some range attenuation but the cutoff is very poor and ambiguous due to the periodic modulation. In the copending application of Whiteley and Adrian for a Fuse System, Ser. No. 566,318 filed Feb. 17, 1956 a fuse system is disclosed which provides a rapid unambiguous range cutoff by frequency modulating the transmitted carrier frequency by band-limited random noise. This system disclosed by Whiteley and Adrian does not have as sharp a cutoff as in the system of the instant invention. Another disadvantage of the Whiteley and Adrian system is that because the range curve reaches a maximum at zero range sensitivity of the system to nearby reflectors such as missile structure will be high since such surfaces under vibration may generate a doppler signal that will interfere with fusing action.

Applicant's copending application Ser. No. 761,447 filed Sept. 16, 1958 for a "Noise Modulated Fuse System" provides a band-pass amplifier associated with the balanced mixer in the system and set above the low-frequency, doppler band whereby the range function peaks at a finite range other than zero thus eliminating interference with the fuse action by signals returned from nearby vibrating missile structure and this feature is incorporated in the present invention.

The fuse system of the present invention also provides a sharper cutoff in the range than in the system disclosed in the Whiteley and Adrian application Ser. No. 566,318 because a periodic wave plus white noise is used for frequency modulating the carrier signal. The instant system further provides amplification of the returned signal outside the microphonic region thereby eliminating significant microphonics that would interfere with the fusing system.

The present invention comprises a means for producing a periodic wave which may be a sine wave, a triangular wave or any other suitable waveform having a periodic repetition modified by a band of white noise at random frequencies. The term "white noise" is well known. The origin of the term "white noise" goes back to white light which is a mixture of all colors (or frequencies) in equal amounts; it is discussed in several texts, and, for example, "Random Processes in Automatic Control" by Lanning and Battin, McGraw-Hill 1956, page 142, refers to "white noise" as a random process possessing a constant power spectral density. The modified periodic wave is passed through a band-pass filter and applied to an oscillator for frequency modulating the transmitted carrier signal which transmits in the direction of a target. A portion of the transmitted signal is mixed with the return signal received from the target, the latter being phase modulated by the doppler effect because of the relative movement between the missile and the target and the output of the balanced mixer provides a signal at or near zero range which is almost a pure doppler wave while at greater ranges this signal becomes more random. The signal from the balanced mixer is fed to a band-pass amplifier set above the maximum doppler frequencies, preferably at a harmonic of the modulating frequency of the periodic wave, such as the first or third harmonic, so that almost no signal passes through it at close range thus resulting in a "hole" in the range function. The band-pass amplifier also provides amplification outside the microphonic region. The signal is then rectified and passed through a doppler amplifier which provides further amplification of the signal which is adequate to actuate the detonation circuit of a fuse.

One object of the invention is to provide a fuse system having a rapid unambiguous range cutoff.

Another object of the invention is to provide a fuse system wherein the carrier signal is frequency modulated by a periodic wave plus band limited white noise whereby a sharper range cutoff is obtained and the signal strengths are strong.

A further object of the invention is to provide a fusing system wherein the mixed transmitted and returned output is amplified outside the microphonic region.

Another object of the invention is to provide a fusing system having a reduced response to nearby reflectors whereby a "hole" in the range function is provided at very close range.

A still further object of the present invention is to provide a fuse system which can be utilized in close proximity to a surface such as the ocean without receiving spurious signals from sea return which will trigger the fuse prematurely.

Figure 2:
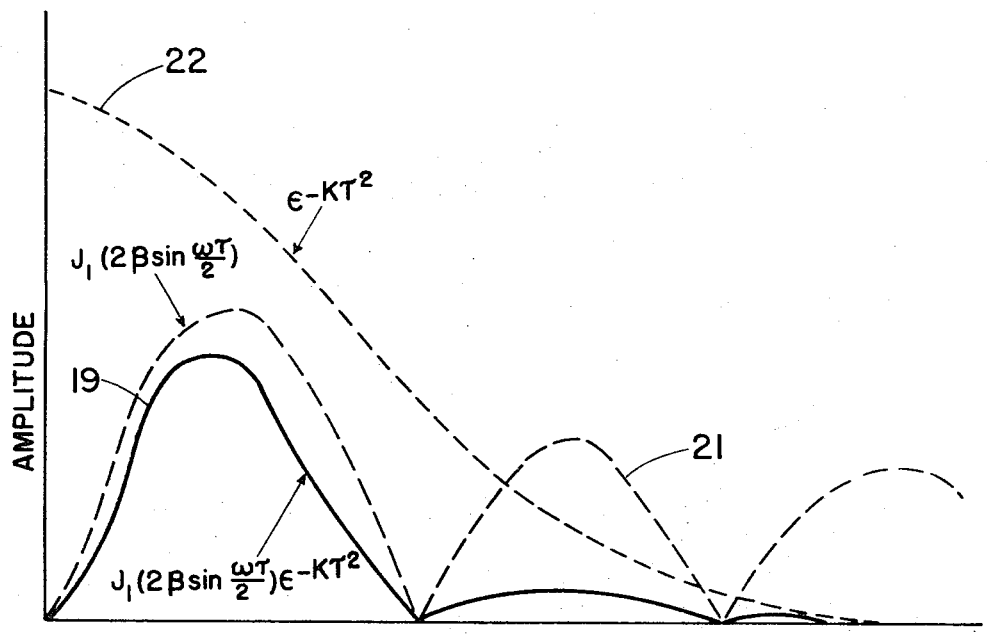

Other objects and many of the attendant advantages of this invention will be readily appreciated as the same becomes better understood by reference to the following detailed description when considered in connection with the accompanying drawings wherein:

FIG. 1 is a block diagram illustrating one preferred embodiment of the present invention; and FIG. 2 is a diagram illustrating the relative amplitude of the response with respect to range of the present system utilizing noise plus periodic modulation as compared to the previous systems using sinusoidal or noise modulation alone.

With particular reference to FIG. 1 the present invention comprises a fuse system assumed to be mounted in a missile which is guided on a path to approach a target with the RF energy from the fuse being transmitted toward the target and a return echo signal being received therefrom. In block 11 a periodic wave or sine wave is modified by a band of white noise which is passed through a band-pass filter 12 and is used to frequency modulate the oscillator 13. The filter 12 is not critical with respect to the portion of the frequency spectrum passed or the width of the band which is passed. In block 11, periodic sine waves may be produced by means of an oscillator, periodic square waves may be produced by a multivibrator or by clipping of sine waves, or triangular waves produced by integrating a square wave using a simple RC circuit, all of which are well known means of producing periodic waves. The white noise may also be produced in a number of well-known ways, such as by amplification of vacuum tube noise, resistor noise, transistor noise, etc. The summation of a periodic wave and white noise in block 11 may be done in a number of known ways which includes inserting both waves into a common resistor, resulting in a periodic wave plus noise frequency-modulated signal.

The periodic wave plus noise frequency-modulated signal from the oscillator 13 is transmitted in the direction of the target through an antenna 14. A portion of the transmitted energy is applied to the balanced mixer 15 where it is combined with the return signal from the target which has been modified by the doppler effect of the relative movement between the missile and target and is received through the antenna 16 and applied to the balanced mixer 15.

The output from the balanced mixer is passed through a band-pass amplifier 17 set above the maximum doppler frequencies preferably at a harmonic of the modulating frequency of the periodic wave such as the first or third harmonic so that almost no signal passes through it at close range resulting in a "hole" in the range function. This output signal is then passed through a rectifier and doppler amplifier 18 and the output from the rectifier and doppler amplifier 18 will be a doppler wave having an envelope of a form corresponding to the product of the range functions resulting from the periodic wave and from the noise modulation which in the case of sine wave plus white noise would be in the form shown in FIG. 2 by the solid black line 19.

This output goes to the detonation circuit of the fuse (not shown) and when it reaches a suitable level on the relative amplitude curve of FIG. 2 it provides a trigger signal for firing the detonation circuit to explode a warhead (not shown).

If desired, a fixed delay (not shown) could be inserted between the oscillator 13 and the balanced mixer 15 to make the fuse signal peak at a desired range. Obviously, one antenna could be used for both transmitting and receiving but the system illustrated using separate antennas is preferred.

The explicit theory which explains the operation of the Whiteley and Adrian Fuse System noted supra is explained in detail therein and applied generally with respect to the noise portion of the modulation in the present invention. The range function (shown by the solid black line 19 in FIG. 2) or envelope of the doppler wave output from the rectifier and doppler amplifier 18 due to noise plus periodic modulation is the product of the range functions due to noise modulation alone.

The various types of frequency modulation are graphically compared in FIG. 2 wherein the range function for sinusoidal modulation, noise modulation and noise plus periodic modulation are plotted. The dotted line 21 represents the range function for sinusoidal modulation which is $J_n(2\beta \sin \omega \tau/2$ where $\beta$ is the modulation index, $\omega$ is the modulation frequency, $\tau$ is the time for the signal to travel to the target and back and $n$ is the number of the particular harmonic amplified and is the first harmonic as illustrated.

The range function plotted as dotted line 22 for noise modulation is $e^{-k\tau^2}$. The system for the present invention illustrated by the solid black line 19 of FIG. 2 is the product of the sinusoidal and noise modulations which is $$J_n\left(2\beta \sin \frac{\omega\tau}{2}\right)e^{-k\tau^2}$$

and is illustrated for the first harmonic.

It will be apparent that the fuse system of the instant invention will give a much sharper range cutoff than either of the systems using sine wave modulation or noise modulation alone (i.e. will have less output for range targets than modulation alone sine wave modulation, curve 21 FIG. 2, or noise modulation alone, curve 22 FIG. 2) and has very little ambiguity at an extremely low level as compared to the ambiguity of the sine wave by itself. Curve 21 of FIG. 2 shows that sine wave modulation will result in response to reflection at various ranges (i.e. the later humps in curve 21 following the first harmonic, referred to as ambiguity) while in curve 19 the ambiguity (i.e. the humps in the curve following the first harmonic) is very small.

Obviously many modifications and variations of the present invention are possible in the light of the above teachings. It is therefore to be understood that within the scope of the appended claims the invention may be practiced otherwise than as specifically described.

What is claimed is:

1. An FM doppler fuse system comprising means for transmitting a signal having a carrier frequency modulated by a band of random noise plus perioidic modulation, means for mixing the transmitted signal with a return echo signal modified by the doppler effect of the relative movement between the fuse and a target and means for deriving an output operable to actuate said fuse from frequencies above the low-frequency doppler band of the output from said mixing means.

2. A fuse system comprising means for producing a periodic wave plus band-limited white noise operable to produce white noise at random frequencies, white noise being a random mixture of frequencies possessing a constant power spectral density, means for modulating a carrier frequency with said periodic wave plus band-limited noise and transmitting a signal in the direction of the target, means operable to mix a portion of said transmitted signal and a return signal from a target and amplifying and rectifying means operable to pass signals above the low-frequency doppler band from the output of the mixing means for actuating a fuse.

3. A fuse system comprising a white noise plus periodic wave source operable to produce a white noise at random frequencies, white noise being a random mixture of frequencies possessing a constant power spectral density a band-pass filter connected with said source and operable to pass a sharply defined band of signals, oscillating means for modulating and transmitting a carrier frequency with said band of signals and transmitting a signal in the direction of a target, means including a balanced mixer operable to receive a portion of said transmitted signal and a return echo signal from said target, and means connected with said balanced mixer and operable to pass signals above the low doppler frequencies from the output of said mixer for actuating a fuse whereby a sharp range cutoff and a reduced response at very close range are provided in the range function.

4. The system of claim 3 in which said last-named means includes a band-pass amplifier operable to receive the output from said mixer and set above said low doppler frequencies, and a rectifier and doppler frequency amplifier connected to receive the signal from said band-pass amplifier whereby said signal is detected and amplified to produce an output signal representing said range function.

5. A missile fuse system having a sharp unambiguous range cutoff and reduced response at close range comprising; a signal transmitting and receiving means, means for frequency modulating the transmitted carrier frequency of said transmitting means by a periodic wave plus band-limited noise, means for mixing a portion of the transmitted signal with a return signal received from a target moving relative to said missile whereby said return signal is phase modulated by the doppler effect of said relative movement, and means for passing signals from the mixer output above the low doppler frequencies for actuating a fuse.

6. The fuse system of claim 5 in which said frequency modulation means includes a periodic wave plus white noise source and a band-pass filter interconnecting said source and an FM oscillator, whereby, the band of signals passed through said filter modulates the RF carrier frequency in said FM oscillator to provide a strong signal with a sharp unambiguous range cutoff.

7. The fuse system of claim 5 in which said last mentioned means includes a band-pass amplifier set above the low-frequency doppler band and receiving said mixing means output, and a rectifier and doppler frequency amplifier connected to receive the signal from said band-pass amplifier whereby said signal is detected and amplified to produce an output signal representing the range function of said fuse system.

8. In a frequency-modulated doppler fuse system for a missile wherein the transmitted carrier frequency is frequency modulated and a portion of the transmitted signal is mixed with the return signal received from a target moving relative to said missile, the improvement comprising; a periodic wave plus band-limited white noise source connected with a source of said carrier frequency for frequency modulating the carrier signal whereby a sharp unambiguous range cutoff is provided, and means for passing and amplifying output signals above the low-frequency doppler band from the output of said mixed transmitted and return signals to provide a reduced response in the range function for objects at close range.